United States Patent [19]

Valyi

[11] 4,323,341
[45] Apr. 6, 1982

[54] APPARATUS FOR FORMING HOLLOW PLASTIC OBJECTS

[76] Inventor: Emery I. Valyi, 5200 Sycamore Ave., Riverdale, N.Y. 10471

[21] Appl. No.: 129,389

[22] Filed: Mar. 11, 1980

Related U.S. Application Data

[60] Continuation-in-part of Ser. No. 5,962, Jan. 24, 1979, Pat. No. 4,234,302, which is a division of Ser. No. 911,359, Jun. 1, 1978, Pat. No. 4,207,134.

[51] Int. Cl.³ .............................................. B29C 17/07
[52] U.S. Cl. .................................... 425/526; 264/537; 425/530; 425/533; 425/534
[58] Field of Search ............... 425/526, 530, 533, 534, 425/523; 264/513, 530, 537, 538

[56] References Cited

U.S. PATENT DOCUMENTS

| | | | |
|---|---|---|---|
| 3,759,686 | 9/1973 | Trahan | 65/235 X |
| 4,106,886 | 8/1978 | Sokolow | 425/534 X |
| 4,140,464 | 2/1979 | Spurr et al. | 264/537 X |
| 4,140,468 | 2/1979 | Duga | 425/534 |
| 4,197,073 | 4/1980 | Rees et al. | 264/537 X |
| 4,234,302 | 11/1980 | Valyi | 425/526 |

*Primary Examiner*—Jan H. Silbaugh
*Attorney, Agent, or Firm*—Bachman and LaPointe

[57] ABSTRACT

Apparatus and method for forming oriented, blown objects of moldable plastic material requiring transfer of parisons first to tempering molds and then to finishing molds. Disclosure provides a plurality of injection molds for producing a plurality of parisons in spaced relationship to each other and a multiplicity of blow molds in spaced relationship to each other wherein the blow molds have a different center spacing than the injection molds. Disclosure provides means for varying the center spacing of the parisons.

8 Claims, 5 Drawing Figures

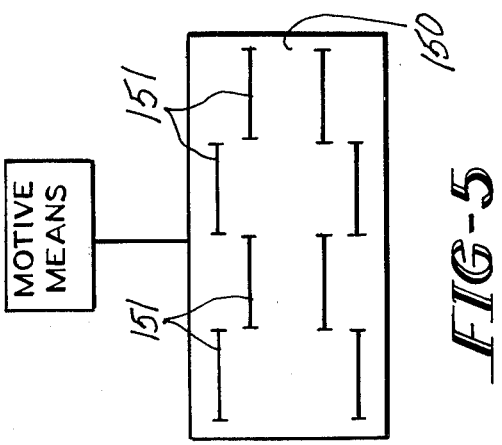
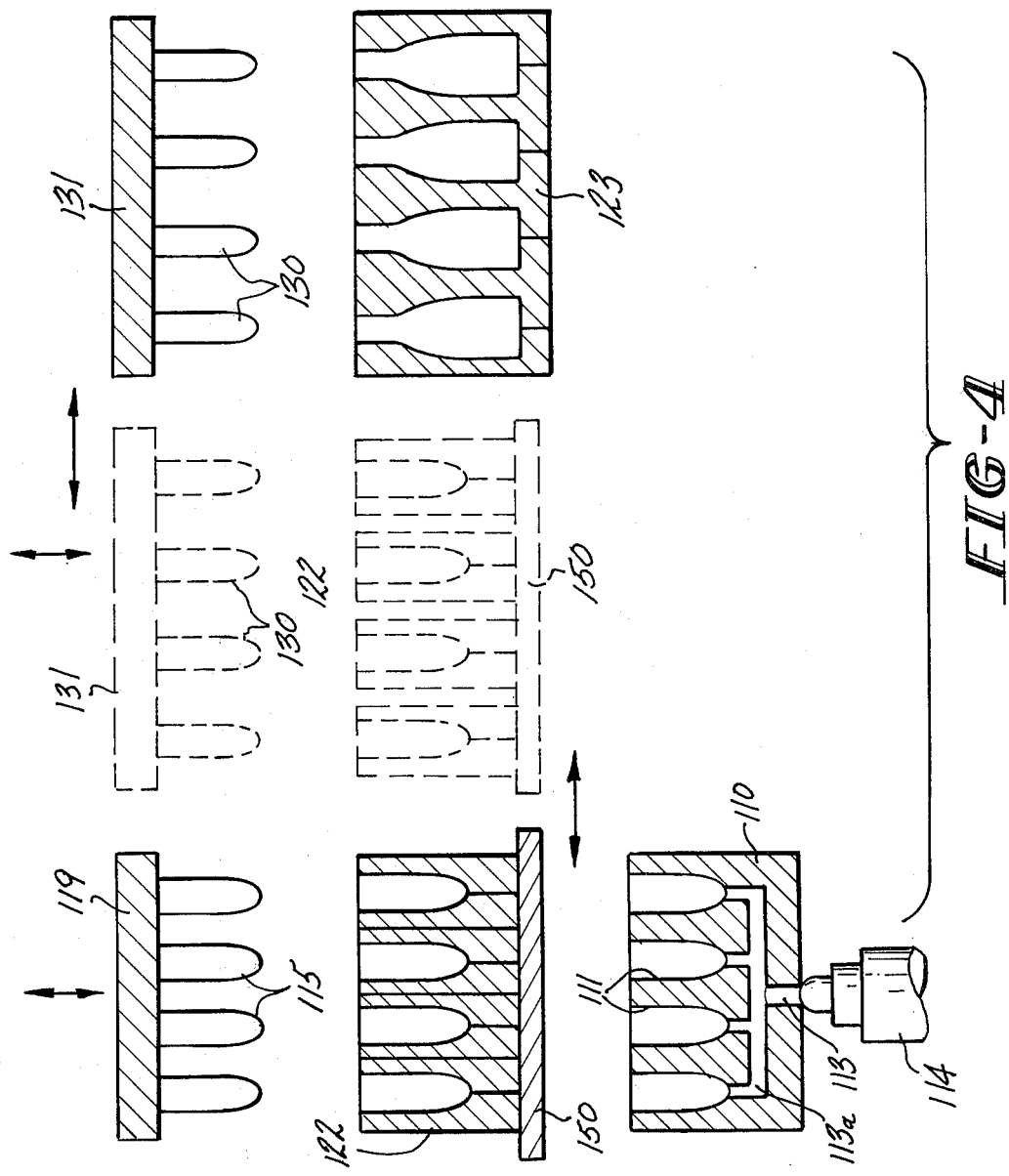

APPARATUS FOR FORMING HOLLOW PLASTIC OBJECTS

CROSS-REFERENCE TO RELATED APPLICATIONS

This application is a Continuation-In-Part of U.S. patent application Ser. No. 5,962, filed Jan. 24, 1979, now U.S. Pat. No. 4,234,302, which in turn is a Divisional of U.S. patent application Ser. No. 911,359, filed June 1, 1978, now U.S. Pat. No. 4,207,134.

BACKGROUND OF THE INVENTION

This invention relates to the art of blow molding from a parison of articles of organic plastic material susceptible to the improvement of their properties by orientation and has for its principal objects the provision of an apparatus which is characterized by a more rapid operating cycle with less effect upon the temperature of the parison, carrying out the steps of parison production, stretch orientation and circumferential orientation in a single uninterrupted, yet completely controlled sequence, and the provision of improved, oriented hollow articles.

The art teaches various methods and apparatus for obtaining blow molded articles of organic plastic material from a parison, such as in U.S. Pat. No. 3,349,155 and U.S. Pat. No. Re. 27,104. Generally, these methods are characterized by forming a parison in a parison mold on a blow core, placing said formed parison and blow core into a blow mold and expanding said parison in the blow mold by means of fluid pressure.

While the blow molding operation tends to impart orientation to the article, such orientation is predominantly circumferential, i.e., not bi-axial. Also, the degree of such orientation is difficult to control. It is therefore difficult to obtain the advantageous properties in the article that bi-axial orientation is capable of providing.

It is known that the control of orientation depends largely upon the control of the temperature of the parison just prior to orientation. It is found that such temperature control is best obtained by enclosing the article prior to the orienting step in an environment, usually a tempering mold, that imparts temperatures to the regions of the parison corresponding to the degree of deformation that is intended for such regions.

It is naturally commercially desirable to process a plurality of parisons at the same time. However, hollow articles to be made from parisons are usually much larger than the parisons themselves and hence cannot be accommodated in their respective molds with the same center spacing as the parisons. Therefore, problems arise when a plurality of parisons are made in parison molds and thereafter also tempered in a plurality of tempering molds having a different center spacing than the plurality of blow molds into which the parisons are to be transferred.

It is, therefore, a principal objective of the present invention to provide an apparatus and method which accommodates the differential center spacing of the parisons and the final blown object.

It is an additional object of the present invention to provide such an apparatus and method which conveniently, expeditiously and inexpensively accommodates the differential center spacing of the parisons and the blown object without interfering with a rapid operating cycle.

Further objects and advantages of the present invention will appear hereinbelow.

SUMMARY OF THE INVENTION

In accordance with the present invention it has now been found that the foregoing objects and advantages may be readily obtained and an improved apparatus provided.

The apparatus of the present invention is a blow molding apparatus for forming a plurality of oriented, blown, hollow plastic articles of moldable plastic material. The apparatus comprises: a plurality of first means hereafter generally designated as first molds for receiving and/or tempering a plurality of parisons in spaced relationship to each other; means for changing the center spacing of said first molds from a first to a second center spacing; a plurality of blow molds in spaced relationship to said first molds for forming said parisons into oriented, blown, hollow plastic articles, said blow molds being in spaced relationship to each other corresponding to said second center spacing; a plurality of first means, preferably first cores, in spaced relationship to each other corresponding to said first center spacing engageable with said first molds at said first center spacing for placing parisons therein; a plurality of second means, preferably second cores, in spaced relationship to each other corresponding to said second center spacing engageable with said first molds at said second center spacing and engageable with said blow molds for removing the tempered parisons from said first molds and placing same into said blow molds for final processing.

The process of the present invention comprises: providing a plurality of parisons in spaced relationship to each other corresponding to a first center spacing; placing said parisons in a plurality of first molds in spaced relationship to each other corresponding to said first center spacing; providing a plurality of second molds in spaced relationship to said first molds for forming said parisons into hollow plastic articles, said second molds being in spaced relationship to each other corresponding to a second center spacing; changing the center spacing of said parisons from said first center spacing to said second center spacing; and placing said parisons in said second molds for final processing. As indicated hereinabove, preferably the center spacing of the parisons is changed by changing the center spacing of the first molds. Preferably also the parisons are placed in the first molds by a plurality of first means, e.g., cores, having a center spacing corresponding to said first center spacing, and are placed in said second molds by a plurality of second means, e.g., cores, having a center spacing corresponding to said second center spacing. Therefore, it is within the scope of the method of the present invention to change the center spacing of the parisons by changing the center spacing of the second cores as described in the aforesaid parent application Ser. No. 5,962, the disclosure of which is incorporated herein by reference.

It can be readily appreciated that the apparatus and method of the present invention conveniently and expeditiously accommodates the differential center spacing required by the parisons and by the final blow article. In order to facilitate the distribution of molten plastic to the several parison molds during the formation of the parisons, the parisons are preferably prepared in a parison mold with center spacing which differs from the center spacing of the blow molds. The first molds in accordance with the apparatus of the present invention are movable from a first center spacing corresponding to the parison mold center spacing to a second center spacing corresponding to the blow mold center spacing so that the parisons may be conveniently removed from the parison molds at the first center spacing and placed into the first molds at the first center spacing. Subsequently, the first molds are moved from the first center spacing corresponding to the parison mold spacing to a second center spacing corresponding to the blow mold spacing so that the tempered parisons may be removed from the first molds at the second center spacing and conveniently placed in the blow molds at the second center spacing.

It can be readily appreciated that this apparatus operates in a streamline manner without loss of cycle time. The variation of the center spacing of the first molds is convenient and easy to accomplish, as by providing separate tracks for each first mold which define the extent of movement thereof. It can be seen that the apparatus of the present invention is simple and expeditious and does not involve the use of cumbersome devices. One may readily accommodate the differential center spacing required by the parisons and the final article without prolonging the operating cycle and, importantly, maintain a rapid operating cycle.

BRIEF DESCRIPTION OF THE DRAWINGS

FIG. 4 is a partly schematic view showing the apparatus and method of the present invention following the sequence of operations shown in FIGS. 1, 2 and 3 wherein a plurality of first molds are provided and a plurality of articles are processed at the same time, wherein portions are shown in phantom.

FIG. 5 is a top view of a base plate for carrying the first molds showing the tracking mechanism for moving the first molds.

DETAILED DESCRIPTION

Figure 1:
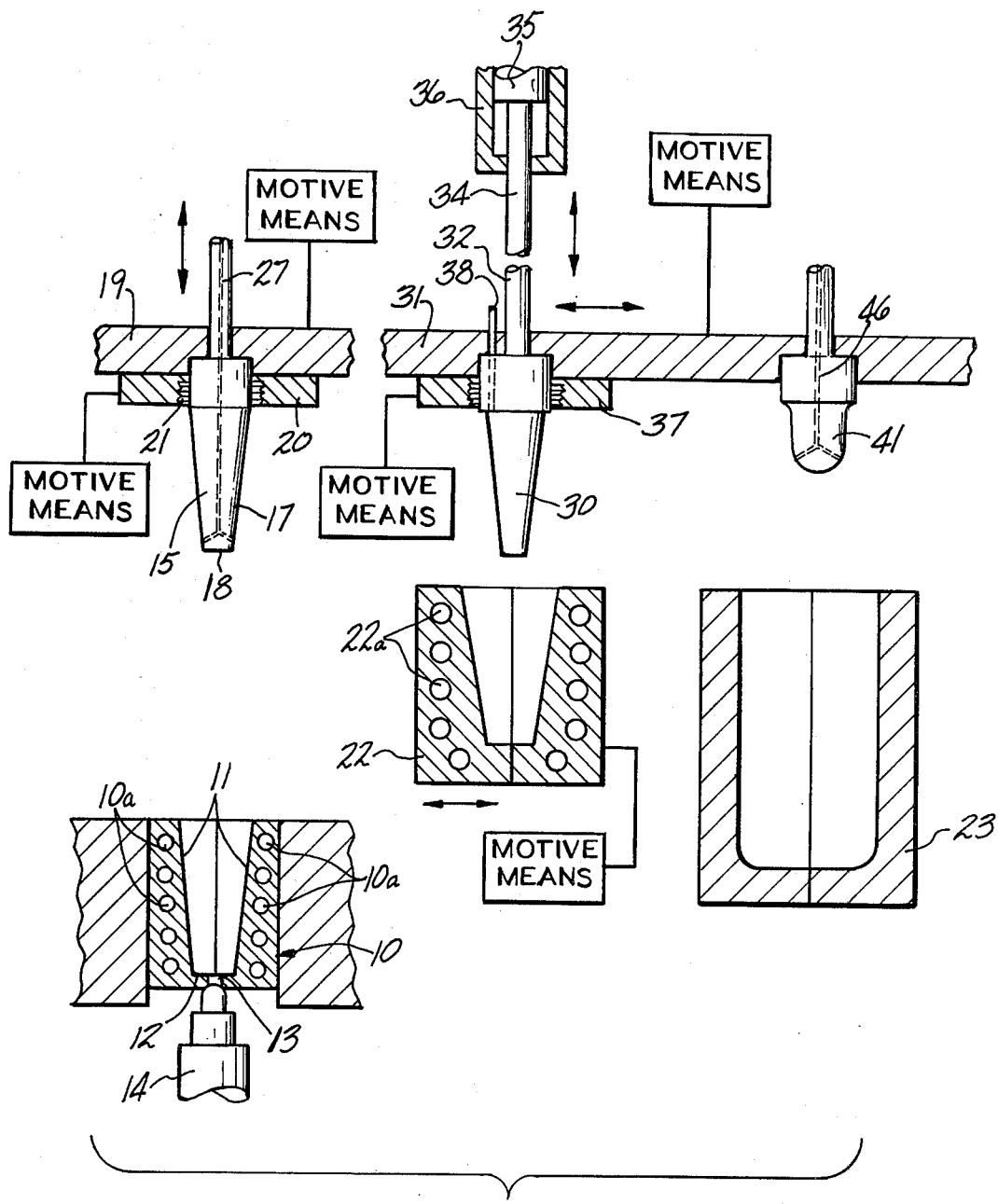
FIGS. 1, 2 and 3 represent elevations, partly in section, and with additional portions in phantom showing a sequence of operations for obtaining an oriented, blown, hollow plastic article wherein for convenience of understanding only a single article is processed.
Figure 2:
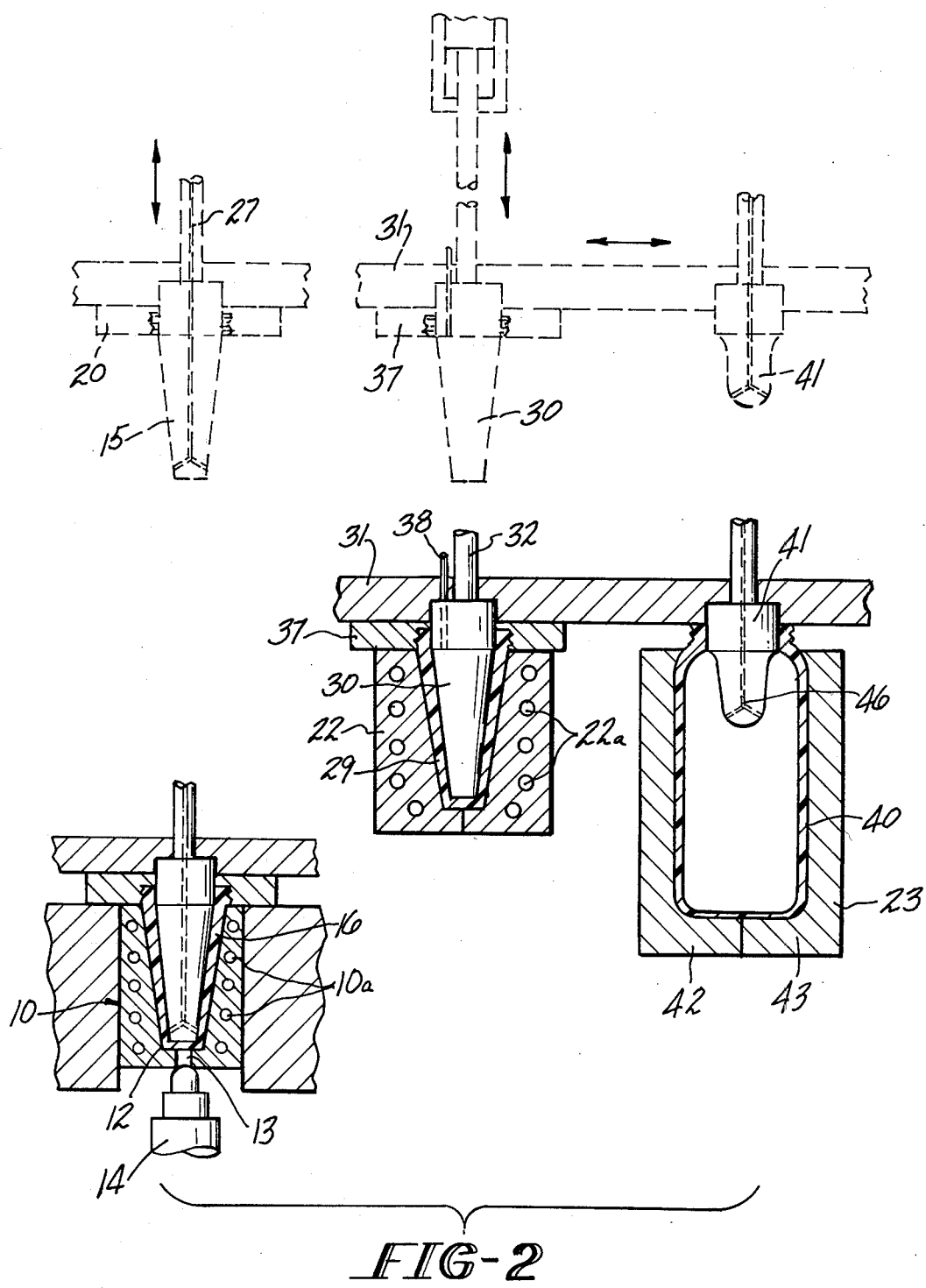
Figure 3:
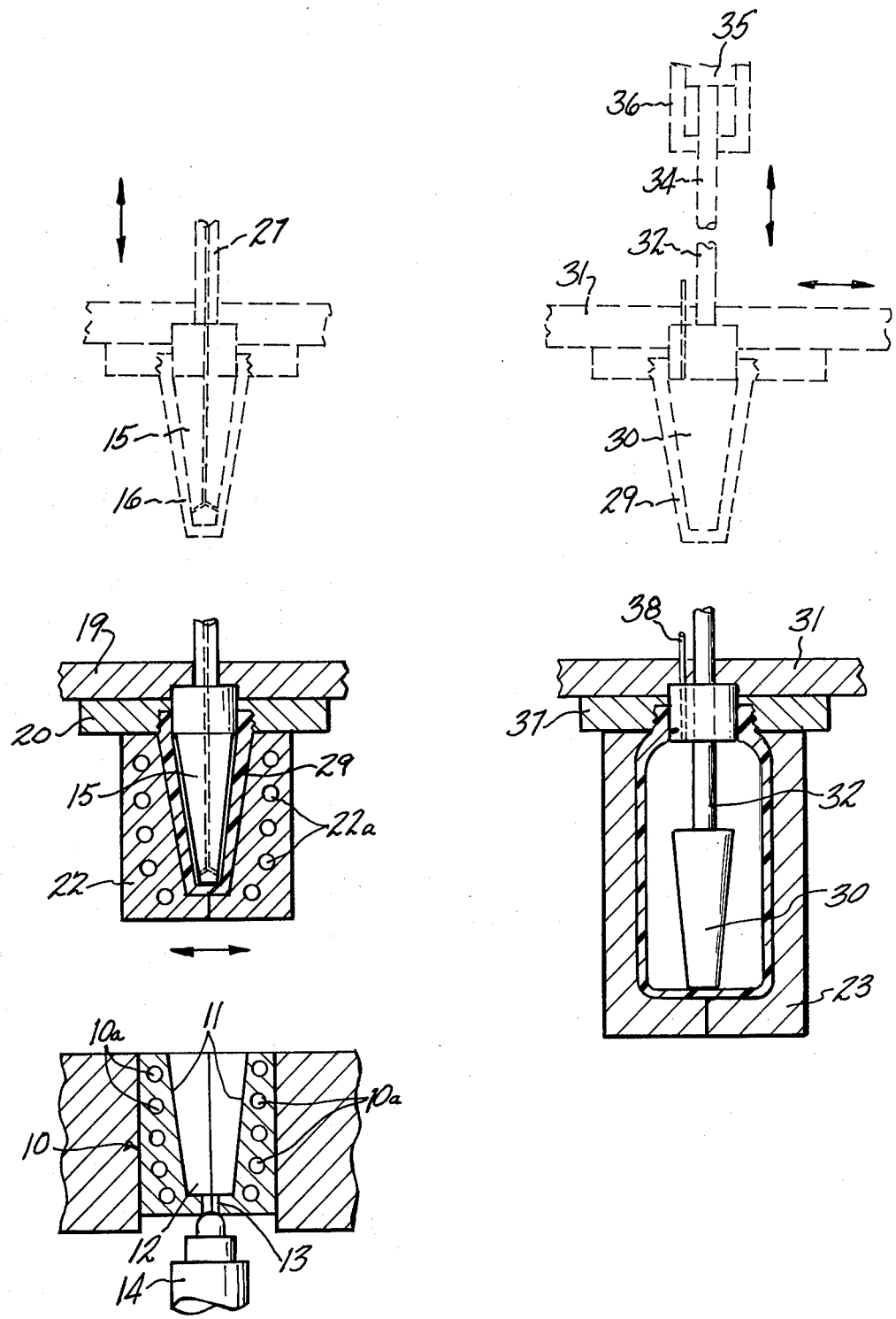

The apparatus and method of the present invention forms a plurality of oriented, blown, hollow plastic articles of moldable plastic material. In accordance with the present invention a plurality of articles are processed simultaneously. For convenience of understanding, however, FIGS. 1, 2 and 3 illustrate the general operating cycle with only a single parison being processed at a time. However, it should be understood that in accordance with the present invention a plurality of such parisons are processed simultaneously as will be shown in more detail in FIGS. 4 and 5 hereinbelow.

Referring to FIGS. 1, 2 and 3 in more detail, the parison is provided by an injection molding process which is a preferred embodiment. However, the present invention is not limited thereto and includes other molding processes that are capable of processing parisons, such as compression molding, casting, extrusion or the like. FIG. 1 depicts a parison mold 10, having outer walls 11 which may be separable, depending upon the shape of the parison and which are adapted to form the outer surface of the parison, and having an end wall 12 shaped to form the end wall of the parison. The parison mold 10 may be temperature controlled, such as by heating or cooling elements 10a contained therein which are connected to appropriate heat transfer sources (not shown) whereby such temperature control may be arranged in several zones to obtain different temperatures in different regions of the parison. The end wall 12 of the parison mold has an injection opening 13 registering with an injection nozzle 14 through which the organic plastic material is injected into the parison mold. The parison mold 10 is shown as split for convenience in opening to release the formed parison; however, it should be understood that the invention is not limited thereto, as one-piece molds suitably designed for release of the parison are encompassed herein.

As indicated hereinabove, the plastics contemplated in accordance with the present invention are the moldable organic plastic materials and preferably those whose properties are improved by orientation, such as the polyolefins, polyethylene, polypropylene and copolymers thereof, polyvinyl chloride, polystyrene and other styrenic resins, acrylonitrile, methacrylonitrile, polyvinylidene chloride, polycarbonates, polyesters, polyamides, fluorocarbon resins, etc.

The formation of the parison in accordance with the embodiment illustrated in FIGS. 1, 2 and 3 takes place after a first core 15 (preferably a blow core) illustrated in FIG. 1, and set forth in phantom in FIGS. 2-3, and mold 10 are brought into engagement by suitable mechanical means such as the motive means shown schematically in FIG. 1. In the embodiment shown in FIGS. 1, 2 and 3, core 15 is axially reciprocable in the direction of the arrow into and out of engagement with mold 10. Upon completion of injection through nozzle 14, a parison 16, having substantially the configuration represented in FIG. 2, is formed.

Side wall 17 and an end 18 of core 15, walls 11 and 12 of parison mold 10, and the neck mold 20 constitute a mold cavity in which the parison is formed. Core 15 may be temperature controlled in one or more zones, such as by internal heat exchange circuits known in the art contained therein, which are connected to an appropriate heat transfer or power source (not shown). Core 15 is carried by platen 19. This assembly further includes a neck mold 20 in which the neck of the parison is formed and which remains engaged with the parison while the latter remains on blow core 15 after disengagement from the parison mold, which neck mold may be independently temperature controlled. The neck mold may possess threads 21 for defining a threaded opening in the final molded object. The neck mold 20 may be split and opened into two portions by suitable mechanical means such as the motive means shown schematically in FIG. 1, to release the parison, or, if the configuration of the neck permits, may be of one-piece construction and, thus, separable from the parison as a unit.

During separation of the parison mold 10 and the core 15, the parison 16 is sufficiently retained thereon by means of neck mold 20, or by other means, such as an undercut, if necessary. Upon separation, the parison assumes the position depicted in FIG. 1 and shown in phantom in FIG. 3.

First mold 22, which may be a conditioning, i.e., tempering mold and may be a pre-forming mold and will be referred to as a tempering mold for purposes of description only, and core 15 are brought into alignment so as to juxtapose first mold 22 and parison 16, illustrated, as noted earlier in phantom in FIG. 3. As shown, first mold 22 is laterally reciprocable by suitable mechanical means, such as the motive means shown schematically in FIG. 1, with the first mold moving in the direction of the arrow into and out of alignment with core 15. Mold 22 may be temperature controlled, frequently in multiple zones which may be disposed along the length thereof, as by heating or cooling elements 2a which are connected to appropriate heat transfer sources (not shown). As may be seen, the first, i.e., tempering mold serves in the present context primarily as a transporting means of the parisons. It is possible, although not preferred, to align first mold 22 and parison 16 by lateral or circular reciprocation of core 15.

Referring to FIG. 3, upon the alignment of first mold 22 and core 15 bearing parison 16, core 15 and parison 16 are then placed within first mold 22, for example, by the axial reciprocation of core 15. Other means of engaging parisons and molds may be used and are well known, such as those disclosed in U.S. Pat. Nos. 2,853,736 and 2,974,362. The parison is then released from first core 15 into first mold 22, as by stripping it axially which may be facilitated, if desired, by partially expanding the parison. The partial expansion is carried out by aarranging for the mold cavity of mold 22 to be a small fraction of an inch larger than the parison and by applying fluid pressure through channel 27 on the inside of the parison thereby expanding the parison into conformance with the cavity of mold 22. Passage 27 is provided within core 15 and may terminate at a valve-like, closeable portion of the core well known in the art. Separation of the parison from core 15 may then be facilitated by air-pressure stripping of the parison from the core, with removal of the core from the parison leaving the parison in mold 22. It should be noted that such expansion is not always necessary, but is often helpful as in the example shown. If desired, an exit channel (not shown) may be provided on mold 22 to permit the removal of air from the mold cavity as the parison enters facilitating the establishment of contact of the parison with the mold walls.

The temperature of first mold 22 is controlled by heating or cooling means 22a connected to appropriate heat transfer sources (not shown), or by electric heaters, to optimize the parison temperature for subsequent operations in a manner to be described below. Naturally any suitable heating or cooling means may be used in any of the hating or cooling coils described herein, such as a passage containing heat transfer fluid maintained at a suitable temperature, electric resistance heaters or radiant heat sources.

FIG. 3 illustrates the pressure molded parison 16 as conformed to the shape of the mold cavity in first mold 22, for example, by the exertion of fluid pressure, with the partially expanded parison labeled 29. At times the shape of partially expanded parison 29 may be made such that a second core, e.g., stretch-blow core 30, may be inserted into substantially complete surface contact therein, as shown in FIG. 2, permitting heat exchange throughout, by contact of the second core and the parison. In such an instance, the said shape should exhibit no undercuts or reverse curves on the inside surface, for example, due to an outward taper over its inside surface. However, the parison shape does not always permit this, for example, in some cases of long, narrow-necked parisons, in which cases it may be necessary to forego contact heating the inside of the parisons.

After completion of the transfer of the parison into first mold 22, that mold and first core 15 are separated as by moving the first core plus first neck mold axially in the direction of the arrow, usually accompanied by the application of air pressure at the inside of the parison by means of the first core, and the parison 29 thus transferred is retained in first mold 22. Core 15 and neck mold 20 are then returned to the starting position as illustrated in FIG. 1, and first mold 22 containing the parison 29 which may be partially expanded, is shifted laterally into the position illustrated in FIGS. 1 and 2.

Parison 29, which is retained within first mold 22, is thereby transferred into alignment with a second core 30 which is carried by platen 31 and which may be provided with temperature control means, and which may have an external configuration shaped to conform to the internal configuration of the parison 29. Whenever axial stretching of the parison is desired, core 30 will include a stretch and blow assembly which comprises a mandrel extension 32 which is reciprocable as indicated by the arrow in FIG. 1 to axially extend the parison 29. An actuating means is shown which comprises a push rod 34 which engages extension 32, and which is connected to a piston 35 housed within a cylinder 36 which may, for example, be responsive to fluid pressure exerted by a pump, not shown. By controlling the flow of fluid into cylinder 36, the speed of piston 35 and therefore of the movable portion of core 30 may be controlled to stretch the parison at the speed best suited for the temperature of the parison. Such actuating means is merely illustrative of one manner of operation, as other actuating means known in the art can be employed herein. If a highly oriented article is not desired, the axial extension operation may be dispensed with.

For the final forming sequence, the parison is separated from first mold 22 by retaining it at the neck region on core 30 and, at times, also on a neck mold 37 which may operate in the same manner as neck mold 20. In the absence of neck mold 37, one may retain parison 29 on core 30, for example, by close fit of core 30 within the neck of the parison.

Core 30 is situated in spaced relationship to core 15, and first mold 22 is situated in spaced relationship to second mold 23, to enable both cores to engage a respective mold when core 15 is aligned with mold 22 as shown in FIG. 3. This facilitates the concurrent pursuit of both the tempering and final forming processes with separate parisons. Further, and with regard to the transfer of parison 29 to core 30, it should be noted that parison mold 10 is spaced from first mold 22, as illustrated in FIGS. 1 and 2, so that core 15 may engage with mold 10 to form another parison while core 30 engages with first mold 22 and also while a third core 41 ejects the fully expanded article 40. The ability to concurrently conduct the various operations of the process outlined herein comprises one of the notable advantages of the invention. The simultaneous formation, transfer, final expansion and finished article removal is envisioned in accordance with the present invention as illustrated in the accompanying figures and can be further modified to provide additional intermediate molds and cores, such as mold 22 and core 30.

A fluid passageway 38 is provided and terminates at the end surface of that portion of the core 30 which does not move during the movement of extension 32. Fluid passageway 38 also connects to a source of fluid under pressure, not shown. Accordingly, fluid may enter the space inside parison 29 during final expansion, discussed hereinafter, once passageway 38 is opened by movement of the extension 32 and correspondingly of the movable portion of core 30. If the transfer of the parison out of first mold 22 is to be facilitated by gripping the parison from the inside, an elastic sleeve may be provided and pressurized from its inside surface by means of pressure air through a secondary passageway causing the sleeve to expand against the inner half of the parison neck as shown in FIG. 1A of parent application Ser. No. 5,962.

In the instance where core 30 may be made to conform to the inner contour of parison 29, it can be seen that core 30 may be heated or cooled. Thus, the temperature of parison 29 may be adjusted by heat exchange between both the inner and outer surfaces of parison 29 and the corresponding mold and core surfaces.

The parison 29 is thereby rapidly and uniformly prepared for further processing, such as axial extension and final expansion. This is a considerable advantage since it avoids the problem of parison cooling during a multi-step process. Whenever core 30 may be made to conform to the shape of parison 29, the heat transfer conditions may be further improved over the ones prevailing if only the outer surface of parison 29 is in heat transfer relation with a corresponding mold element. Naturally, the conventional temperature regulators that are used to control the heating means of core 30 and mold 22 are able to do so individually, in several zones within the assembly, corresponding to the desired temperature profile.

Referring to FIG. 2, the transfer of parison 29 to finishing mold 23 is conducted by core 30 which is in engagement with first mold 22 and parison 29. Core 30 with parison 29 thereon is separated from first mold 22, which may be split to release parison 29, by moving core 30 axially by suitable mechanical means such as the motive means shown schematically in FIG. 1. Upon release, core 30 with parison 29 thereon returns to the position illustrated in FIG. 1 and depicted in phantom in FIG. 3.

As can be seen in FIGS. 1 and 2, a third core or article removal plug 41 for removing the fnished article is in integral, lateral spaced relationship to second core 30, with both the second and third cores being carried on platen 31. Therefore, when the second core engages parison 29 in second mold 22, the removal plug 41 engages the finished article 40 in the second mold 23. As shown by the arrows, the second and third cores are axially and laterally reciprocable so that the second core transfers parison 29 from mold 22 to mold 23 by a combination of axial, lateral and axial movements. Simultaneously, third core 41 removes the finished article from mold 23, which may be split and separable to facilitate the extraction of the finished article, and transfers same to an ejection station located laterally of mold 23 (not shown) for removal of the finished article while core 30 engages mold 23.

Core 30 carrying parison 29 is then received in mold 23, with the temperature of parison 29 having been adjusted as described above. Parison 29 is usually axially extended to the bottom of mold 23 by the advancement of the movable portion of mandrel 32 by means of push rod 34 at a predetermined rate. Thus, the present invention may controllably stretch the parison longitudinally before final blowing and thereby produce orientation in the axial direction as well as the orientation subsequently produced by blowing. It can be seen that the temperature of the parison preparatory to stretching and blowing may be properly and conveniently controlled by the respective molds and cores. While stetching occurs, passageway 38 is kept open to provide pressure equalization of the inside of the parison with the atmosphere to prevent collapse of the prison due to the vacuum created inside it as its inside volume increases during stretching.

After completion of axial extension, the parison is fully expanded to conform to the configuration of finishing, i.e., second mold 23, to form the final object 40 which, in the embodiment illustrated herein, is an open-ended container. Naturally, a wide variety of shapes may be prepared as the commercially known shapes which may be a bottle, a jar or a cup-shape. Full expansion is accomplished by supplying fluid under pressure through passageway 38 into the interior of axially extended parison 29, or at times and at various rates, into the interior of the parison while it is being extended.

After full expansion is completed, second core 30 and second mold 23 containing final object 40 are separated as described hereinabove with reference to first core 15 and first mold 22. The second core is moved axially, laterally and axially, which positions the second core in the first mold 22 and at the same time positions removal core 41 in finished article 40 for removal of same after the finished article has cooled sufficiently for that purpose.

In the embodiment illustrated herein, finishing mold 23 is longitudinally split into two sections labeled 42 and 43, which may reciprocate in and out of communication by an actuating means, not shown, such as for example a hydraulic cylinder. Thus, sections 42 and 43 may be parted an amount sufficient to permit the removal of article 40 by core 41 which may be inserted into the neck thereof with a tight fit. Prior to such opening of mold 23 and removal, fluid pressure may be applied through passageway 46 to continue the blowing process, if desired, in cases requiring continued contact of article 40 with second mold 23 for the purpose of extended cooling. Alternatively, passageway 46 may be utilized to continue to supply cooling air to the inside of the finished article, or to apply suction to the inside of the finished article to aid in retaining same thereon.

It is well known that in injection molding it is desirable to minimize the length over which molten plastic is made to flow and also to group individual cavities in injection multi-cavity molds so as to minimize the platen space which helps accuracy in molding due to the reduced hazard of deflecting the support structure of the mold under the great forces of injection. FIGS. 4 and 5 show the apparatus and method of the present invention which operates in accordance with the procedure and apparatus of FIGS. 1, 2 and 3 including a plurality of first cores 115 in spaced relationship to each other carried by a common carrying means 119 and a plurality of first molds 122 in spaced relationship to each other carried by a common carrying means such as plate 150, a plurality of second cores 130 in spaced relationship to each other carried by a common carrying means 131 and a plurality of blow molds 123 in spaced relationship to each other. Naturally, all molds may be split for convenience of article or parison removal. As shown in FIG. 4, a plurality of parisons are formed in parison mold 110 wherein a plurality of cavities 111 are arranged in a row cooperating with first cores 115 carried on common carrying means or support plate 119. The parison mold 110 cooperates with injection unti 114 through which molten plastic is injected through channel 113 distributed by runner 113a. The spacing between cavities 111 corresponds to the dimensions of the parisons. Accordingly, the spacing of the first cores 115 carried by common carrying means 119 also corresponds to the dimensions of the parisons, or corresponds to the first center spacing.

However, hollow articles to be made from parisons are frequently much larger than the parisons and hence cannot be accommodated with the same center spacing as the parisons. For example, the parison for a large bottle may have a diameter of approximately 1½ inches, while the bottle made from the parison may measure 4 inches in diameter. As seen in FIG. 4, blow molds 123 have a different or second center spacing than parison dies 111 and first cores 115. Similarly, second cores 130 must have a center spacing corresponding to the second or blow mold center spacing for placement of the parisons in the blow molds for final processing.

In accordance with the present invention, means are provided operatively associated with first molds 122 for changing the center spacing thereof from the first to the second center spacing. Thus, as shown in FIGS. 4 and 5 molds 122 rest on base plate 150. Each mold 122 rides on separate tracks 151 which define the extent of movement of molds 122. Motive means shown schematically in FIG. 5 are provided operatively associated with molds 122 for moving molds 122 from the first to the second center spacng. Thus, molds 122 are moved on tracks 151 to correspond to the first center spacing for engagement with first cores 115. When molds 122 are moved laterally as in FIGS. 1–3 for engagement with second cores 130, molds 122 are moved on tracks 151 to correspond to the second center spacing as shown in phantom in FIG. 4 for engagement with second cores 130. The processing cycle is then continued in a manner after FIGS. 1, 2 and 3.

As can be readily seen, parisons are prepared in accordance with the present invention in parison dies 111 together with first cores 115 corresponding to the first center spacing. First cores 115 carrying the parisons are moved axially out of engagement with prison dies 111 and the parisons are placed and left in tempering molds 122 wherein the tempering molds are moved on tracks 151 to correspond to said first center spacing for engagement with the first cones. The parisons are tempered in the tempering molds, with the tempering molds moved laterally in a manner after FIGS. 1–3 while the tempering molds are also moved from the first center spacing to the second center spacing on tracks 151 by said motive means. The parisons tempered in the tempering molds are then removed from the tempering molds by second cores 130 at which time the tempering molds have been shifted so that they correspond to the second center spacing for engagement with the second cores. The parisons are then finally processed in blow molds 123 in a manner after FIGS. 1–3.

Naturally, the particular method for moving the tempering molds shown in FIGS. 4 and 5 is illustrative only and alternate means may be provided. For example, a single continuous tracking means may be provided on base plate 150 with stop points located thereon for defining the extent of movement of tempering molds 122. Similarly, in the preferred embodiment two rows of tempering molds are provided wherein the tempering molds in each row are movable in a manner shown in FIGS. 4 and 5. Any number of tempering molds or rows of tempering molds may be provided depending upon the particular apparatus desired. Similarly, if desired the transfer of parisons may be conducted by neck molds as shown in FIGS. 1–3 rather than cores as shown in FIGS. 4 and 5.

As discussed hereinabove and as shown in the aforesaid parent application Ser. No. 5,962, in accordance with the present invention one may change the center spacing of the parisons by changing the center spacing of the second cores after removal of same from the first molds but before engagement with the blow molds. Thus, first molds 122 may be arranged so as not to change their center spacing. Instead, second cores 130 may be arranged to have changeable center spacing, by means analagous to the ones shown above in relation to first molds 122. In that alternative embodiment, the second cores 130 are aligned with first molds 122 which in turn retain the same center spacing as cores 115. After removal of the parisons from first molds 122, second cores 130 transport them to blow molds 123 after or while the center spacing of cores 130 is changed to correspond to that of blow molds 123.

Thus, the purpose of producing parisons with a minimum center spacing suitable for that step may be accomplished.

This invention may be embodied in other forms or carried out in other ways without departing from the spirit or essential characteristics theeof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A blow molding apparatus for forming a plurality of oriented, blown, hollow plastic articles of moldable plastic material which comprises: a plurality of first molds for receiving and tempering a plurality of parisons in spaced relationship to each other to optimize the parison temperature for orientation and blowing; means for changing the center spacing of said first molds from a first to a second center spacing; a plurality of second molds in spaced relationship to said first molds for forming said parisons into oriented, blown, hollow plastic articles, said second molds being in fixed spaced relationship to each other corresponding to said second center spacing; a plurality of first means in fixed spaced relationship to each other corresponding to said first center spacing engageable with said first molds at said first center spacing for placing parisons therein for tempering; means for changing the relative position of said first molds from a position adjacent said first means to a position away from said first means, wherein said means for changing the center spacing is operative to change the center spacing independent of said means for changing the position of said first molds from a position adjacent said first means to a position away from said first means; plaate means which holds said first molds and which is capable of being moved with said first molds from station to station; track means on said plate means and engaged with said first molds which define the limits of the movement which changes the center spacing of said first molds; motive means for moving said first means into and out of engagement with said first molds; a plurality of second means in fixed spaced relationship to each other corresponding to said second center spacing engageable with said first molds at said second center spacing and engageable with said second molds for removing the tempered parisons from the first molds and placing same into said second molds for final processing; motive means for moving said second means into and out of engagement with said first and second molds, respectively; and means associated with said second molds for forming said parisons into oriented, hollow plastic articles.

2. An apparatus according to claim 1 wherein said first means are first cores and said second means are second cores.

3. An apparatus according to claim 2 wherein said first cores are carried on a common support plate and said second cores are carried on a common support plate.

4. An apparatus according to claim 2 including a plurality of parison molds cooperating with an injection unit and engageable with said first cores for placing said parisons on said first cores, said parison molds being spaced from each other corresponding to said first center spacing, wherein said means for moving said first cores moves the first cores into and out of engagement with said parison nolds and first molds, respectively.

5. An apparatus according to claim 4 including motive means for laterally reciprocating said first molds between and away from said first cores and parison molds, wherein said means for moving the first cores is operative to axially reciprocate the first cores into and out of engagement with the parison molds and first molds, respectively.

6. An apparatus according to claim 2 including means operatively associated with said second cores for axially extending and expanding said parisons in said second molds to form oriented, blown, hollow plastic articles.

7. An apparatus according to claim 2 wherein said first molds are carried on a base plate and including separate track means for each of said first molds on said base plate defining the limits of movement of said first molds from first center spacing to second center spacing.

8. An apparatus according to claim 2 wherein said second molds are blow molds having the form of separable halves.

* * * * *